United States Patent [19]

Lehoczky

[11] Patent Number: 4,593,223

[45] Date of Patent: Jun. 3, 1986

[54] BULB GENERATOR STATOR YOKE

[75] Inventor: Kalman N. Lehoczky, New Berlin, Wis.

[73] Assignee: Siemens-Allis, Inc., Atlanta, Ga.

[21] Appl. No.: 655,153

[22] Filed: Sep. 27, 1984

[51] Int. Cl.$^4$ .............................................. H02K 1/12
[52] U.S. Cl. ..................................... 310/258; 310/259
[58] Field of Search ............... 310/216, 218, 258, 259, 310/254

[56] References Cited

U.S. PATENT DOCUMENTS

| | | | |
|---|---|---|---|
| 1,030,095 | 6/1912 | Knight | 310/259 |
| 1,194,232 | 8/1916 | Raymond | 310/258 |
| 1,477,773 | 12/1923 | Schou et al. | 319/258 |
| 1,828,275 | 10/1931 | Barnholdt et al. | 310/258 |
| 1,901,315 | 3/1933 | McCarty | 310/258 |
| 2,112,747 | 3/1938 | Wood | 310/258 |
| 2,342,502 | 2/1944 | Taylor | 310/258 |
| 3,462,624 | 8/1969 | Darrieus | 310/258.6 |
| 3,987,325 | 10/1976 | Wilson et al. | 310/258.6 |
| 3,988,622 | 10/1978 | Starcevic | 310/258.6 |
| 4,469,973 | 9/1984 | Guyot et al. | 310/258 |

Primary Examiner—Donovan F. Duggan
Attorney, Agent, or Firm—F. W. Powers; J. L. James

[57] ABSTRACT

A stator yoke is provided for a bulb generator or motor. The stator yoke includes a cylindrical wrapping plate with flanges connected to the ends of the wrapping plate. Yoke plates are connected to the core. Axial ribs extend through openings in the yoke plates and interconnect the wrapping plate, the yoke plates and the flanges. The flanges, yoke plate and axial ribs combine to increase the stiffness of the wrapping plate which increases the ability of the yoke to resist deformation caused by static and dynamic forces.

20 Claims, 4 Drawing Figures

BULB GENERATOR STATOR YOKE

BACKGROUND OF THE INVENTION

This invention relates to bulb generators and motors and more particularly to a stator yoke construction for horizontal and semi-horizontal bulb generators and motors.

Typically, the total bulb unit of a bulb generator or motor consists of a nose and intermediate ring section on the upstream side of the stator and a turbine cone on the downstream side of the stator. The stator yoke is surrounded by water and is part of the total bulb unit. The yoke of the bulb generator or motor has to satisfy a number of structural requirements. For example, the yoke has to be rigid enough to withstand forces due to the magnetic field and the external hydrostatic pressure both at rated and transient conditions without significant deformation. The yoke of a bulb generator typically contains a cylindrical wrapping plate and yoke plates. The yoke plates together with the wrapping plate represents a circular beam which is subjected to radial bending due to the magnetic field and the hydrostatic pressure. The magnetic field based in the rotor poles produces a sinusoidal deformation wave with a node number equal to the pole number. The external hydrostatic pressure caused by the surrounding water is dependent upon the depth under the surface of the water. Therefore, the pressure is greater at the bottom region of the yoke than at the top region of the yoke. This unevenness of pressure causes the yoke to be deformed in an elliptical or egg shape. Quite understandably, deformation into an egg shape is highly undesirable because the deformation interferes with the tolerances of the parts which rotate with respect to one other. Accordingly, it will be appreciated that it would be highly desirable to provide a stator yoke for a bulb generator which resists deformation.

There are also other types of loads and forces encountered during normal operation. For example, there are magnetic forces encountered if the stator and rotor are not concentric, torsional forces due to the rated torque and various axial hydrostatic loads. These loads are typically changing during transient conditions and the yoke has to satisfy all the combinations of static and dynamic forces. An important consideration in yoke design is the maintenance of the radial air gap between the rotor and stator. A change in the air gap or unevenness of the air gap around the rotor has a self amplifying effect which is undesirable. A reduction of air gap increases the magnetic forces which produces a further reduction of the air gap. Actually, it is not the stresses which are the main concern in yoke design; rather, it is the deformation and stability.

Since bulb generators have a relatively small air gap, these considerations are more important for bulb generators than other hydrogenerators or motors. In order to limit the air gap changes, the radial bending stiffness of the yoke has to be as large as possible. This is usually difficult to satisfy because the hydrodynamical and electrical requirements are in conflict. Viewed hydrodynamically, the highest possible efficiency would require the smallest possible yoke outer diameter. An efficient generator should have a large stator diameter. Since the radial yoke height has to shrink between the increasing stator outer diameter and the decreasing yoke outer diameter, the necessary bending stiffness cannot be achieved.

The normal way to solve the conflict is to transfer the missing stiffness to components outside of the central part of the yoke. For example, the stiffness may be transferred to the flanges at the ends of the wrapping or to the bridges and brackets supporting the bearings, coolers, brakes, etc. This transfer of radial rigidity depends on the axial bending stiffness of the wrapping and axial stiffener ribs. If the axial stiffness is low, the flanges and brackets are not able to help. Therefore, the thickness of the wrapping plate and ribs has to be increased considerably. Many axial ribs have to be welded in between the flanges and yoke plates, increasing the manufacturing costs and weight. Accordingly, it would be appreciated that it would be highly desirable to provide a yoke for a bulb generator which has the strength required to resist deformation and changes in the air gap caused by static and dynamic forces which is economical to manufacture.

The axial cooling air flow between the wrapping plate and the core represents a further problem. The yoke plates typically must be equipped with many large openings providing sufficient cross-sectional area for cooling air flow. However, these holes weaken the yoke and reduce the rigidity. Accordingly, it would be appreciated that it would be highly desirable to provide a yoke which has sufficient cooling air flow without a reduction in the strength and rigidity of the yoke.

It is an object of the present invention to provide a yoke for a bulb generator which has sufficient rigidity and stability to resist changes in the radial air gap between the rotor and stator.

Another object of this invention is to provide a stator yoke which has the necessary bending stiffness and axial bending strength to reduce deformation caused by static and dynamic forces.

Another object of the invention is to provide a stator yoke for a bulb generator which has sufficient flow cross section for effective cooling while maintaining the rigidity of the stator yoke.

Yet another object of the present invention is to provide a stator yoke construction for a bulb generator which is economical to manufacture and which has reduced weldments and improved flow conditions for effective cooling.

SUMMARY OF THE INVENTION

Briefly stated, in accordance with one aspect of the invention, the foregoing objects are achieved by providing a stator yoke for a bulb generator which has a core. The yoke includes a wrapping plate and flanges connected to the ends of the wrapping plate. Yoke plates which have openings are connected to the core. Axial ribs extend through the yoke plate openings and interconnect the wrapping plate, the yoke plates and the flanges. The flanges and ribs together with the wrapping plate provide a structure which has sufficient radial bending stiffness and axial bending strength to resist deformation due to static and dynamic forces. The openings in the yoke plate allow the flow of fluid therethrough for effective cooling of the yoke. The use of the yoke plate openings and ribs allows the unit to be economically manufactured and assembled while providing the strength required to resist deformation.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
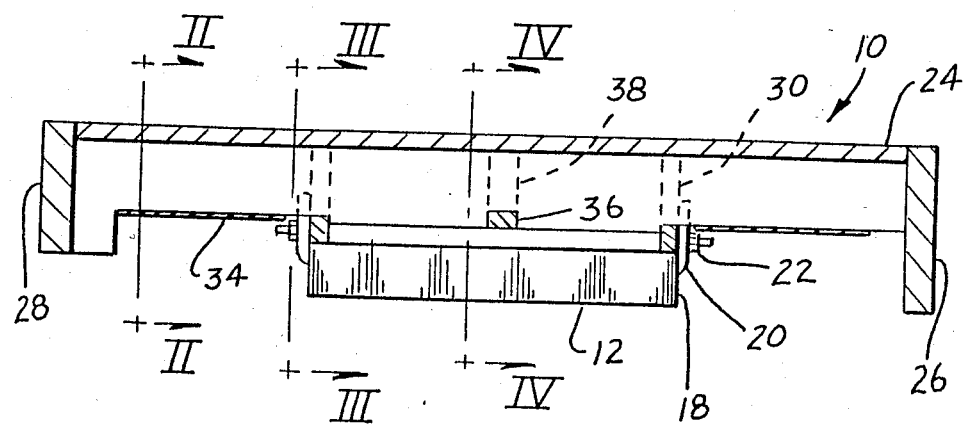
FIG. 1 is a simplified diagrammatical longitudinal cross sectional view of a bulb generator or motor showing the stator yoke and the connection between the laminated core and the yoke.
Figure 2:
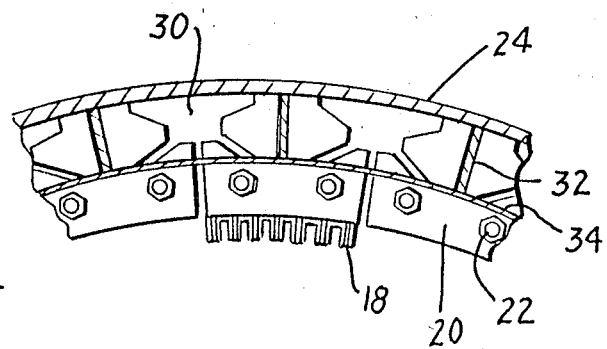
FIG. 2 is a view taken along line II—II of FIG. 1 and is a diagrammatical radial cross sectional view.
Figure 4:
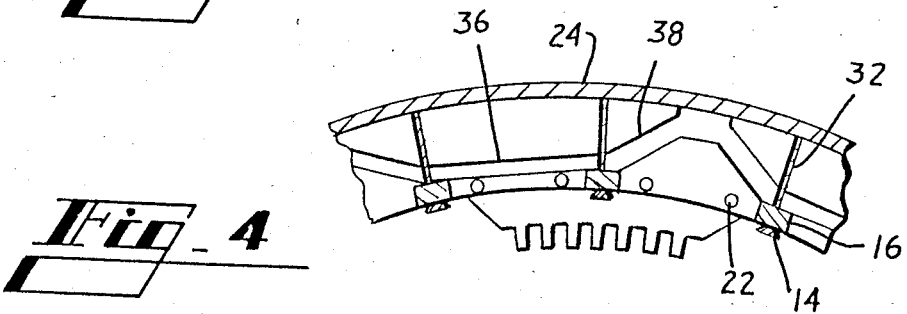
FIG. 4 is a view taken along line IV—IV of FIG. 1.

Referring to FIG. 1, a stator yoke 10 is provided for electrical machinery such as a bulb generator or motor which has a core 12. The core is constructed of suitable material such as laminated steel, for example, and is anchored to the yoke 10. Preferably, dovetail bars 14 (FIG. 4) are supported by dovetail bar supports 16. The dovetail bars 14 anchor the stator core laminations 12 to the yoke 10. The internal axial pressure in the core lamination is brought up by fingers 18 and finger plates 20 which are engaged by pretensioned studs 22. To facilitate manufacturing, the dovetail bars can be combined with the studs or the dovetail bars and the dovetail bar supports can be integrated into one component. The dovetail bars or dovetail bar supports may consist of several components with built-in springs or other devices as desired for a particular application.

The stator yoke 10 includes a cylindrical wrapping plate 24 which has first and second opposed end portions with a flange 26, 28 connected to each end portion of the wrapping plate. The yoke also includes yoke plates 30 and axial ribs 32 which are preferably positioned through holes in the yoke plates which are also used for cooling. The cylindrical wrapping plate is preferably welded to the flanges and yoke plates and interconnected by the axial ribs. The ribs may run uninterrupted from flange to flange or may extend from one flange to a nearby yoke plate. The thickness of the ribs may remain constant or may vary over its axial length.

The yoke plates 30 extend radially outward from the core and extend parallel to the flanges. The ribs may extend radially or may be positioned at an angle to the radial direction. The ribs may extend axially parallel to the machine axis or they may be arranged at an angle relative to the machine axis. Also, the ribs may be curved or extend in a tangential direction, for example, between the flange and an adjacent yoke plate. By this construction, the parts of the stator yoke can be coordinated so that the holes in the stator yoke plates are sufficient to obtain the desired cooling characteristics while maintaining a size sufficient for retaining the structural integrity of the unit.

The ribs 32 can be equipped with a stiffner plate 34 to increase both the radial and axial bending stiffness of the yoke. The stiffener plate has an arcuate configuration and may be cylindrical or semi-cylindrical.

Tangential stiffeners 36 may be positioned between the ribs or between the ribs and the dovetail bar supports. The tangential stiffeners can have a diagonal extension 38 which attaches to the wrapping plate 24. The tangential stiffeners increase the radial bending stiffness of the yoke and at the same time transfer torsional moments due to the machine torque from the dovetail bar supports to the wrapping plates. Of course, the number of tangential stiffener systems used will depend upon the length of the core and the forces anticipated. The radial bending stiffness of the yoke is determined by the total moment of inertia of the wrapping plate, flanges, yoke plates, stiffener plate, and the tangential stiffeners or diagonal extension. The axial bending stiffness is dependent upon the moment of inertia based on the various sections II—II, III—III and IV—IV.

Where the other components are sufficiently rigid, the internal stiffener plate 34 is not necessary. However, the stiffener plate 34 is still usable where not needed for rigidity. The stiffener plate is usable for ventilation in leading the cooling fluid from behind the core to the axial end of the yoke where the cooling fluid is introduced into ducts leading to the coolers. The stiffener plate in this application can be made of thin plates bolted to the ribs.

Figure 3:
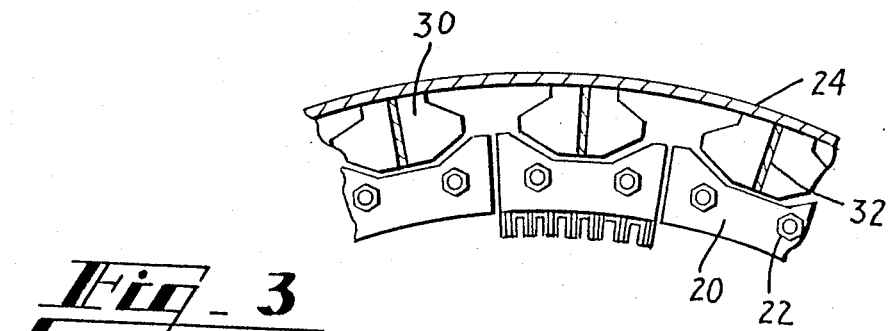
FIG. 3 is, a view taken along line III—III of FIG. 1.

As was mentioned earlier, it is the deformation not the stress that is the primary concern in connection with the yoke construction. For this reason, the stiffener cylinder may be shorter than the distance between the flange and yoke plate. By this construction, at the gap between the internal stiffener plate and the flange or yoke plate, the stresses will still be well within tolerable limits, but the total deformation will be reduced considerably because of the axial length of that section where the ribs and internal stiffener are welded together. To achieve the largest possible axial bending stiffness, the ribs should be as high as possible radially. As shown in FIG. 3, the finger plates may have a radial height reduction in their mid-portion to provide both higher ribs and a larger opening through which the cooling air to circulate.

In practice, using the components as set forth above, there has been noted a reduction in the total length and volume of welds used. A 25% reduction in welds has been achieved without a significant reduction of structural stiffness or integrity. This improvement was achieved by essentially establishing a three-dimensional grid system supporting the essential forces and moments and by eliminating the unncessary components and reducing the length and volume of the welds. Thus, the present invention provides a stator yoke for a bulb generator or motor which has a reinforced three-dimensional structure which has sufficient axial and radial strength to resist deformation. This structure is simple to manufacture and saves time and labor by having a reduced amount of welding.

As will be evident from the foregoing description, certain aspects of the invention are not limited to the particular details of the examples illustrated, and it is therefore contemplated that other modifications or applications will occur to those skilled in the art. It is accordingly intended that the claim shall cover all such modifications and applications as do not depart from the true spirit and script of the invention.

What is claimed as new and desired to be secured by Letters Patent of the United States is:

1. A stator yoke for a bulb generator having a core, comprising:

a wrapping plate having first and second opposed ends;

first and second flanges connected to the respective first and second ends of the wrapping plate;

first and second yoke plates each having an opening;

means for connecting the core and yoke plates; and an axial rib extending through the yoke plate openings and interconnecting the wrapping plate, the yoke plates and the flanges.

2. A stator yoke, as set forth in claim 1, wherein the wrapping plate is cylindrical.

3. A stator yoke, as set forth in claim 1, wherein the yoke plates extend radially outward from the core and extend parallel to the flanges.

4. A stator yoke, as set forth in claim 1, including a plurality of axial ribs between the flanges parallel to one another.

5. A stator yoke, as set forth in claim 1, wherein the connecting means includes a dovetail bar support anchored to the core and a dovetail bar connecting the dovetail bar support and the yoke plates.

6. A stator yoke, as set forth in claim 1, wherein the axial rib extends uninterrupted from flange to flange.

7. A stator yoke, as set forth in claim 1, wherein the openings of the yoke plate have a size sufficient for the passage of cooling fluid therethrough.

8. A stator yoke, as set forth in claim 1, including a stiffener plate attached to the rib.

9. A stator yoke, as set forth in claim 1, including a tangential stiffener arranged axially between the yoke plates.

10. A stator yoke, as set forth in claim 9, wherein the tangential stiffener interconnects adjacent dovetail bar supports.

11. A stator yoke, as set forth in claim 9, including a plurality of axial ribs and wherein the tangential stiffener interconnects adjacent ribs.

12. A stator yoke, as set forth in claim 9, wherein the tangential stiffener interconnects the wrapping plate and one of the rib and dovetail bar supports.

13. A stator yoke, as set forth in claim 9, wherein one end of the stiffener is associated with one of the rib and dovetail bar supports and the other end of the stiffener is associated with another one of the rib and dovetail bar supports.

14. A stator yoke, as set forth in claim 1, including a stiffener plate connected to the ribs and forming an arcuate body.

15. A stator yoke for a bulb generator having a core, comprising:

dovetail bar supports attached to the core;

a cylindrical wrapping plate;

a flange connected to either end of the cylindrical wrapping plate;

first and second yoke plates each having openings therein;

a dovetail bar connecting the yoke plates and dovetail bar supports; and axial ribs interconnecting the wrapping plate, the yoke plates and the flanges.

16. A stator yoke, as set forth in claim 15, including stiffener plates connected to the rib and forming an arcuate body.

17. A stator yoke, as set forth in claim 15, including tangential stiffeners, tangentially connecting selected ones of the ribs, dovetail bar supports and wrapping plate.

18. A stator yoke, as set forth in claim 15, including tangential stiffeners positioned axially in the spaces between the yoke plates.

19. A stator yoke, as set forth in claim 15, including:

fingers connected to the core;

fingerplates attached to the fingers; and pretension studs connecting the finger plates to the yoke plates.

20. A stator yoke for a bulb generator having a core, comprising:

a wrapping plate having first and second opposed ends;

first and second flanges connected to the respective first and second ends of the wrapping plate;

first and second yoke plates each having an opening;

means for connecting the core and yoke plates; and an axial rib extending through the yoke plate openings and connected to the wrapping plate, the yoke plates and the flanges.

* * * * *